May 26, 1959  J. B. CURRAN ET AL  2,887,718
PELLET MILL

Filed Feb. 15, 1955  2 Sheets-Sheet 1

INVENTORS
JOHN B. CURRAN &
BY JOSEPH L. GRAHEK

Marechal, Biebel, French & Bugg
ATTORNEYS

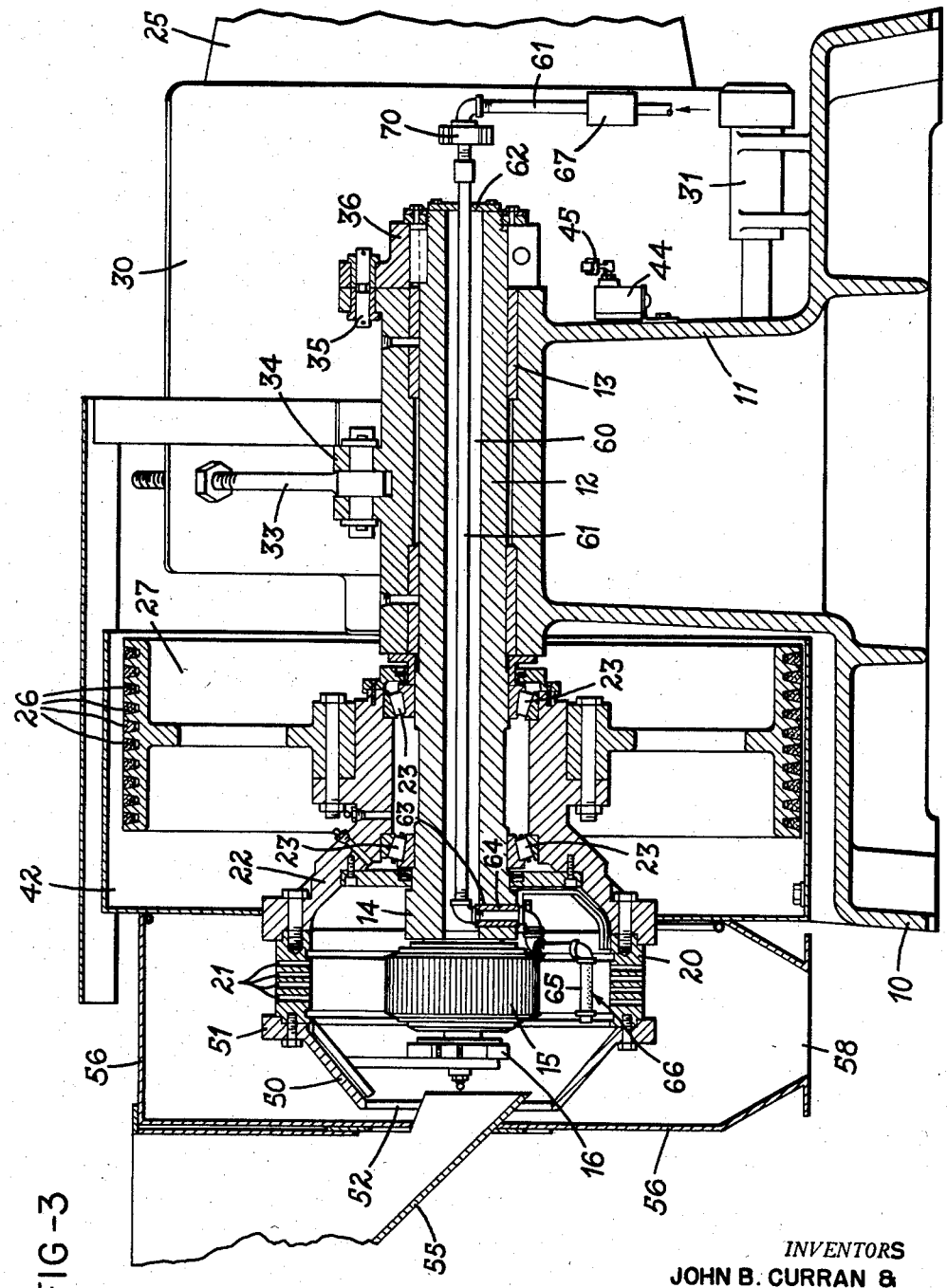

United States Patent Office

2,887,718
Patented May 26, 1959

2,887,718

PELLET MILL

John B. Curran, Salfordville, and Joseph L. Grahek, Williamsport, Pa., assignors to Sprout, Waldron & Company, Inc., Muncy, Pa., a corporation of Pennsylvania Application February 15, 1955, Serial No. 488,375

16 Claims. (Cl. 18—12)

This invention relates to pellet mills of the type employing a perforated die and a plurality of rolls mounted against the die for forcing material to be formed into pellets through the perforations in the die.

The invention is particularly adapted to pellet mills in which the rolls are stationarily supported within an annular die, and the die is mounted for rotation with respect to the rolls. In operation a mass of pulverous material to be pelleted is introduced into the interior of the die. As the die rotates, the material is carried through the nips formed by the inner surface of the rotating die and the stationarily supported rotatable rolls bearing thereagainst, thus forcing the material outwardly through perforations or extrusion openings in the die. Cut-off knives are mounted adjacent the outer surface of the die to cut off the extruded pellets as the material emerges outwardly from the perforations.

In pelleting certain materials it may be desired or necessary to admix a binding or lubricating fluid with the pulverous material to be pelleted so that a damp or even soggy mass or mash is presented to the rollers for extrusion through the die in order that the otherwise pulverous material will maintain itself in pellet form. In many cases it may be satisfactory to so admix a fluid with the material to be pelleted prior to the introduction of the material into the pellet mill.

In other cases, however, it may be undesirable or impracticable to admix the material to be pelleted with a fluid prior to introduction thereof into the pellet mill. For example, the characteristics of the pulverous material may be such that admixture of steam or water prior to introduction into the mill results in so altering the characteristics of the mass that satisfactory pellets cannot be made. Similarly, the characteristics of the particular material to be pelleted and/or the commercial requirements and specification of the finished product may be such as to preclude the addition of substantial proportions of water or other fluids if the final characteristics of the material are to be maintained. Heretofore, accordingly, there have been pulverous materials which have been considered as impracticable for pelleting if the addition of steam or water thereto was attempted, such as, for example, anhydrous materials, materials which would cake upon being subjected to contact with substantial moisture, materials which would react chemically with various fluids, highly thixotropic materials, and other materials which could not be presented to the die as a mass of sufficiently moist or damp character by prior admixture of water, steam, or other fluid. Indeed, even with previously pelletable materials, the present invention may eliminate the need of preposed mixing equipment altogether.

According to this invention, however, it has been discovered that materials heretofore considered impracticable for pelleting can indeed be pelleted by introducing the material in a dry or completely pulverous state into the pelleting die and there adding to the material a small proportion of fluid immediately prior to the passage of the material between the pelleting die and the cooperating rollers.

It is, accordingly, a principal object of this invention to provide a pellet mill construction whereby a fluid medium may be added to the material to be pelleted within the pellet mill and immediately prior to the extrusion of the material.

Another object of this invention is to provide, in a pellet mill of the character described, apparatus for applying to the inner surface of the pelleting die a lubricating or bonding fluid for contacting the material to be pelleted immediately prior to its passing through the nip of the pelleting rollers.

Another object of this invention is to provide in a pellet mill of the character described apparatus for admixing minor portions of a fluid with pulverous material to be pelleted after the material has been introduced in a dry state into the mill.

Still another object of this invention is to provide in a pellet mill of the character described apparatus for progressively admixing a fluid medium with pulverous material to be pelleted, said admixture occurring only with said pulverous material after feeding thereof progressively into the mill.

A further object of this invention is to provide a method for pelleting pulverous material in which a fluid medium is admixed with the material to be pelleted immediately prior to subjecting the material to extruding pelleting action.

Still a further object of this invention is to provide a method of pelleting pulverous material in which the material is fed dry into a pellet mill and thereafter treated with a bonding or lubricating fluid medium immediately prior to contacting the pelleting pressure.

Other objects and advantages of the present invention will be apparent from the following description, the accompanying drawings, and the appended claims.

In the drawing,

Fig. 3 is a view in vertical section through the pellet mill along the line 3—3 of Fig. 2.

Figure 1:
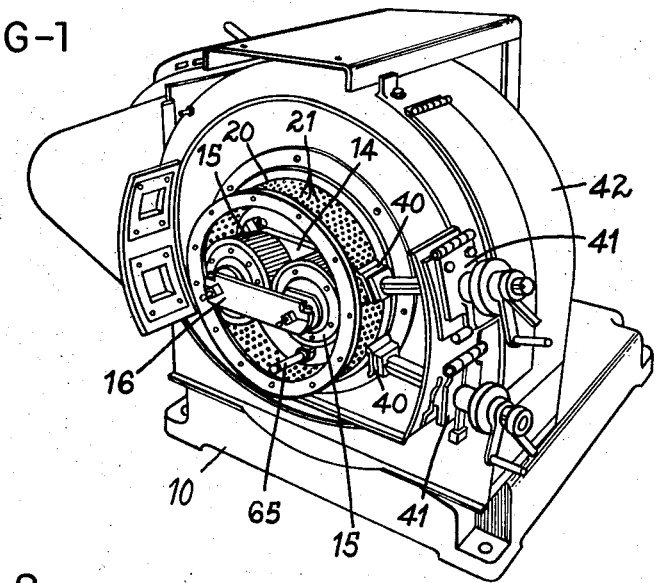
Fig. 1 is a perspective view of a pellet mill embodying the invention and having the cover and outer housing for the pelleting die as well as the preposed feeder conditioner removed for clarity of illustration.

Referring to the drawings which illustrate a preferred embodiment of the invention and in which like characters of reference refer to like elements throughout the several views, the base 10 includes a stand 11 in which a shaft 12 is mounted at its rearward end by bushings 13. At the forward end of shaft 12 is a fork 14 which forms a support for two rollers 15. The shaft 12 is normally held stationary in such position that the fork 14 extends horizontally to support the rollers 15 in side-by-side relation in a substantially horizontal plane. A tie bar 16 extends between the forward ends of the rollers to maintain them in proper parallel alignment.

An annular die 20 having multiple perforations 21 radially therethrough is bolted to a carrier or housing 22 which is mounted for free rotation on shaft 12, as by means of bearings 23. The drive motor for rotating die 20 is indicated at 25, and its shaft carries a pulley 28 connected through belts 26 with a large driven pulley 27 pinned or otherwise secured to the housing 22 which carries die 20. Motor 25 is shown as carried by a plate 30 hinged at 31 on base 10 and provided with a threaded rod 33 attached to stand 11 at 34 for adjusting the tension of the drive belts 26. Shaft 12 is normally held stationary in stand 11 by means of a shear pin 35 carried by boss portions of stand 11 and a shear pin collar 36 keyed or otherwise secured to shaft 12.

A cover 50 for the die 20 includes a flange portion 51 by which it is bolted to the front face of die 20 for rotation with the die. Cover 50 has an inlet opening 52 through the forward end thereof which receives the material to be formed into pellets from a feed spout or hopper 55 mounted on the outer mill housing 56. Housing 56 is mounted on the belt guard housing 42 carried by base 10. Feed spout 55 is fitted for attachment to any suitable supply means for the material to be pelleted, and housing 56 has a discharge space 58 at its lower end for the formed pellets to be discharged into any suitable collecting means.

In normal operation, rotation of die 20 causes material supplied to the interior thereof through spout 55 to be carried into the nips formed by the inner annular surface of die 20 and rollers 15, and this material is thus forced or extruded through the perforations 21 to the outside of the die, where it is cut off in the form of pellets by means of cut-off knives 40 shown as mounted on brackets 41 on belt guard housing 42. If, in the illustrated construction, some jamming should occur, shear pin 35 breaks and shaft 12 begins to rotate instead of remaining stationary. In such case, shear pin collar 36 rotates with shaft 12 and operates a microswitch 44, mounted on stand 11, and effective to shut off the motor 25 when the operating arm 45 of microswitch 44 is engaged by the boss portion of collar 36.

Figure 2:
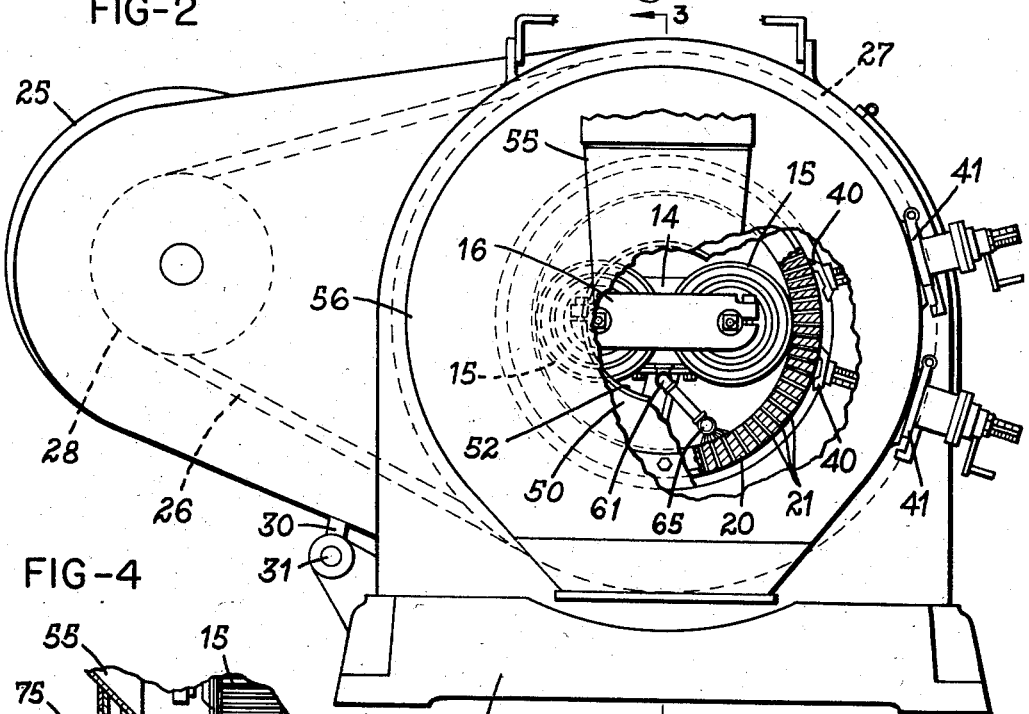
Fig. 2 is a view of the front of a pellet mill embodying the invention with parts of the feed hopper and front cover and die housing broken away.

Shaft 12 includes a longitudinal bore 60 for receiving within the shaft a feed pipe 61 entering the bore through plate 62 and traversing shaft 12 longitudinally into fork 14 at the forward end of shaft 12. Feed pipe 61 emerges downwardly from fork 14 through bore 63 and bushing 64 into the lower portion of the interior of die 20, and terminates in a spray head or distributor indicated at 65. Distributor 65 has perforations 66 which direct a spray of fluid introduced through feed pipe 61 onto the interior face of die 20. Preferably spray head 65 is positioned, as indicated in Fig. 2, substantially at the five o'clock position within die 20 to direct a spray of fluid against the inner face of the die at this point when the die is rotating clockwise.

With the foregoing arrangement, then, a fluid is supplied through pipe 61 and will be delivered and sprayed onto the inner face of die 20 from distributor 65. A rotary fluid-tight joint 70 is preferably positioned in feed pipe 61 outside of shaft 12 to protect the external piping in the event that shear pin 35 should break and permit shaft 12 to rotate. Fluid supplied to pipe 61 may be metered in known manner by a conventional flow meter 67 as desired, and may be supplied at such pressures from an outside pump, not shown, as may be desired to provide the desired intensity of spray and spraying pressure against the inner face of die 20.

Figure 4:
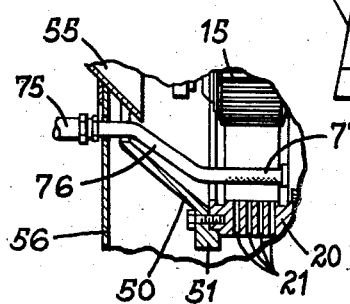
Fig. 4 is a fragmentary detail showing of a modification of a pellet mill embodying the invention.

A somewhat modified arrangement of the foregoing is shown in Fig. 4 in which the fluid from a supply line 75 is introduced through the front face of the die cover 56 below hopper 55 by means of a pipe 76 and distributor 77 positioned within die 20 substantially as distributor 65. Pipe 76 is preferably composed of a readily frangible material such as hard rubber or the like so that it will break to prevent damage to the mill should shear pin 35 break and allow rolls 15 to rotate with die 20.

As will be apparent from the foregoing, any suitable fluid may be introduced onto the inner face of die 20 through pipe 61 and distributor 65. As so introduced, such fluid will contact pulverous material entering die 20 and die cover 50 from hopper 55. Accordingly, the fluid introduced through distributor 65 will contact the pulverous material immediately prior to its passing between the first nip of roller 15 and the inner face of die 20, the rotation of the die in the illustrated embodiment being clockwise as viewed in Fig. 2. Thus, the material to be pelleted may be fed into the interior of die 20 and die cover 50 completely dry, yet portions thereof within the die will contact the fluid entering the die from distributor 65 only immediately prior to being subjected to extruding pressure between the rollers 15 and die 20.

Introducing the fluid at this point—instead of admixing fluid with the material to be pelleted prior to the introduction thereof into the pellet mill through hopper 55—not only admits of handling the pulverous material in dry state prior to the pellet mill, but also performs the task of admixing fluid with the material to be pelleted a little at a time as the material is progressively fed bit by bit into die 20. Thus, substantial horsepower and equipment savings can be achieved with many materials since they can be handled dry prior to introduction into the pellet mill instead of as a damp or soggy mass or mash. Similar savings may be achieved particularly with materials which would otherwise be subjected to steam prior to pelleting to raise the temperature as well as to add moisture to the material, since steam, as well as other fluids, can be introduced into the die through pipe 61 and distributor 65 to maintain an elevated temperature as well as a predetermined desired moisture content in the material to be pelleted within the die immediately prior to the extruding operation.

Whereas in many cases the fluid to be introduced onto the inner face of the die 20 will be water, other fluids, such as, for example, oil or molasses lend themselves to particular pelleting operations such as the pelleting of dried sewage disposal waste, animal feeds, etc., as well as fluids actually intended to react chemically with the pelleted material such as acids, ammonia, and the like in fertilizer manufacture, etc.

It has been noted that the introduction of fluid onto the inner die surface immediately prior to pelleting not only permits the satisfactory use of materials heretofore unavailable for pelleting, but also admits of pelleting other materials with substantial horsepower savings in the pellet mill as compared to when the material is fed into the die as an already damp or soggy mass. Apparently this saving is attributable in some measure to a lubricating effect of the fluid on the die face, but whether the applied fluid has primarily a lubricating effect or primarily a bonding or conditioning effect on the material to enable it to retain the final pelleted form, pellet mills embodying the present invention have been found to give highly satisfactory results with materials heretofore unavailable for pelleting and substantial horsepower savings with other materials.

As will be understood, the volume and rate of flow of fluid through pipe 61 and out of spray head or distributor 65 will depend upon variable factors including the type of fluid, the type of material being pelleted, the speed of the pellet mill, the size of the pellets, etc. Generally speaking, however, the appropriate flow rate is readily adjustable by the operator to provide a sufficient quantity within the die 20 so that the material being pelleted will be conditioned by the fluid so as not to clog the die perforations and so as to retain its pelleted shape after being cut off by knives 40 and yet not have such an excess of fluid being supplied as will result in soft pellets or otherwise adversely affect the material being pelleted.

For example, it has not been heretofore found practicable or commercially satisfactory to pellet substances such as dry ammonium chloride. Such materials do not admit of satisfactory pellet formation in the completely dry state, yet the admixture of a fluid therewith prior to introduction to the pellet mill has not produced satisfactory results. Satisfactory results have been obtained, however, with a pellet mill of the character described by introducing commercial grade ammonium chloride in a substantially dry state into hopper 55 and introducing water to the dry material within the die 20 by means of the spray head 65. As illustrative of the advantages of this invention, for example, with the die 40 rotating at the rate of 293 r.p.m., a production of satisfactory ammonium chloride pellets of approximately ⅜ inch diameter and ½ inch length has been achieved with a maintained production of 3000 pounds an hour using water introduced into the die 20 through spray head 65 at the rate of 200 pounds per hour. Similarly illustrative, a dry fertilizer mixture commonly and commercially known as 10–10–10, with which unsatisfactory results have heretofore been experienced in attempting pelleting, has satisfactorily been pelleted according to this invention at the rate of 6000 pounds per hour of the dry mixture introduced into hopper 55 while 90 pounds per hour of water were introduced through spray head 65 using only about 50 horsepower per hour.

As further illustrative of the advantages of this invention, the production of pelleted animal feeds has heretofore been carried out by admixing steam with the material to be pelleted in a mixer preposed to the pellet mill. In many cases, however, and particularly in the western parts of the United States where the natural moisture content of the material to be pelleted is considerably lower than in other parts of the country, it is not practicable satisfactorily to incorporate into the material by the addition of steam in such preposed mixer a desirably optimum amount of moisture for good pelleting operation. Therefore, the addition of further moisture according to the invention produces enhanced results also when applied to normal pelleting operations.

For example, it has been found that, considering pelleting alfalfa fiber, adding all the steam possible to the fiber in a preposed mixer still did not produce completely satisfactory pellets, although satisfactory pellets were made when, according to the invention, additional moisture was added to the alfalfa within the pelleting die and where the material to be pelleted could be mulled by the pelleting pressure and the moisture thus forced into the dry fiber. Furthermore, in addition to enhancing die life and having a close control of horsepower required by adding a fluid to the material immediately prior to its being subjected to pelleting pressure, such steps according to the invention reduces pelleting horsepower required. Thus, considering a dry untreated feed mash, the addition of about 3% moisture to the mash within the die reduced the horsepower required for pelleting approximately 17% or 18% for the same rate of feed.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

What is claimed is:

1. In a pellet mill of the character described and having a pellet forming die, means for introducing material to be formed into pellets to said die, and means for forcing said material through said die, the combination which comprises means for introducing a fluid to said die separately from said material introducing means, and means for directing said fluid onto said die for contacting said material prior to contact of said material by said forcing means.

2. In a pellet mill of the character described and having an annular rotating pellet forming die, means for introducing material to be formed into pellets into said die, and means for forcing said material through said die, the combination which comprises means for introducing a fluid to said die separately from said material introducing means, and means for directing said fluid in said die for admixture with said material within said die prior to contact of said material by said forcing means, said fluid introducing means being eccentrically disposed within said die axially and radially spaced from said material introducing means.

3. In a pellet mill of the character described and having a rotatably cylindrical pellet forming die, means for introducing material to be pelleted into said die at the lower portion thereof, and roller means for forcing said material through said die upon rotation thereof, the combination which comprises means for introducing a liquid into said die, said liquid introducing means being spaced axially and radially of said die from said material introducing means, and means for spraying said liquid against the inner circumferential surface of said die for admixture with said material prior to the point where said roller means first contact said material.

4. In a pellet mill of the character described and having a normally stationary main shaft, a pellet forming die rotatably mounted on said shaft, and releasable means permitting rotation of said shaft when a predetermined maximum torque is effective thereon, the combination which comprises a fluid feed line extending axially through said shaft and into said die, fluid distributing means at one end of said feed line and eccentrically disposed within said die, and a rotatable fluid-tight joint in said feed line for rotation of said line and said distributing means with said shaft upon release of said releasable means.

5. In a pellet mill of the character described and having a normally stationary main shaft, a cylindrical rotating pellet forming die rotatably mounted on said shaft, and releasable means permitting rotation of said shaft with said die when a predetermined maximum torque is effective on said shaft, the combination which comprises a fluid feed line extending axially through said shaft and into said die, fluid distributing means at the outlet end of said feed line and eccentrically disposed within said die at substantially the five o'clock position therein when said die is rotating clockwise, a rotatable fluid-tight joint in said feed line for rotation of said line and said distributing means with said shaft upon release of said releasable means, and means for introducing binding and lubricating fluid through said feed line and distributing means into said die for admixture therein with material to be pelleted.

6. In a pellet mill of the character described and having a pellet forming die, means for introducing material to be pelleted into said die, means for extruding said introduced material through said die, and a shaft carrying said die and said extruding means, the combination which comprises a fluid feed line axially disposed through said shaft, the intake end of said feed line extending exteriorly of said pellet mill and the outlet end of said feed line being disposed within said die, means for supplying a predetermined amount of fluid through said feed line to said die, and distributing means at said outlet end of said feed line for directing fluid supplied through said feed line into said material to be pelleted on said die adjacent the point of introduction of said material to said die and prior to contact of said material by said extruding means.

7. In a pellet mill of the character described and having a rotatable pellet forming die, means for introducing material to be pelleted into said die adjacent the lower portion thereof, roller means for extruding said introduced material through said die upon rotation thereof, and a shaft carrying said die and said roller means, the combination which comprises a fluid feed line axially disposed through said shaft, the intake end of said feed line extending exteriorly of said pellet mill and the outlet end of said feed line being disposed within said die, means for supplying a predetermined amount of fluid through said feed line into said die, and distributing means within said die at said outlet end of said feed line for directing fluid supplied through said feed line into said material to be pelleted in said die adjacent the point of introduction of said material into said die and prior to contact of said material by said roller means.

8. In a pellet mill of the character described and having a rotatable cylindrical pellet forming die, hopper means for introducing material to be pelleted into said die adjacent the lower portion thereof, roller means for extruding said introduced material outwardly through said die upon rotation thereof, and a normally stationary shaft carrying said die and said roller means, the combination which comprises a fluid feed line coaxially disposed through said shaft, the intake end of said feed line extending exteriorly of said pellet mill and the outlet end of said feed line being disposed eccentrically within said die adjacent the point of introduction of said material, means for supplying a metered amount of fluid through said feed line into said die, and distributing means within said die at said outlet end of said feed line for directing fluid supplied through said feed line into said material to be pelleted in said die adjacent said point of introduction thereof and prior to contact of said material by said roller means.

9. In a pellet mill of the character described having a rotatable pellet forming die, means for rotating said die at one side thereof, means for introducing material to be pelleted into said die at the opposite side thereof, and means for extruding said material through said die upon rotation thereof, the combination which comprises means for introducing a fluid into said die, and means for admixing said fluid with said material in said die adjacent said extruding means, said fluid introducing means being positioned at the same side of said die as said material introducing means but being separate and spaced therefrom.

10. In a pellet mill of the character described having a rotatable pellet forming die, frangible means for rotating said die at one side thereof, means for introducing material to be pelleted into said die at the opposite side thereof, and means for extruding material through said die upon rotation thereof, the combination which comprises frangible means for introducing a fluid into said die, and means for admixing said fluid with material in said die adjacent said extruding means, said fluid introducing means being positioned at the same side of said die as said material introducing means but being separate and spaced therefrom.

11. In a method of forming a plurality of self-sustaining pellets from a mass of pulverous material, the steps comprising introducing said material to a pelleting die, progressively admixing a fluid pelleting medium with said pulverous material on said pelleting die for converting said pulverous material into a pelletable mash, and subjecting said mash to high compacting pressure substantially immediately after said admixture of said fluid.

12. In a method of forming a plurality of self-sustaining pellets from a mass of material, the steps comprising progressively feeding said pulverous material to a pelleting die in substantially dry condition, introducing onto said pelleting die a fluid binding and lubricating medium for admixture with said material, progressively admixing said fluid medium with said material at said pelleting station for forming a pelletable mash, and subjecting said mash to compacting pressure to form said pellets.

13. In a method of forming a plurality of self-sustaining pellets from a mass of material, the steps comprising progressively feeding said pulverous material to a pelleting die in a condition unsuited for pelleting, separately introducing onto said pelleting die a fluid conditioning medium for admixture with said material, progressively admixing said fluid medium with said material at said pelleting die for forming a pelletable mash, and subjecting said mash to compacting pressure to form said pellets.

14. In a method of forming self-sustaining extruded pellets from a mixture having solid and liquid components, the steps comprising introducing said solid component to a pelleting die, separately introducing said liquid component to said die closely adjacent the point at which said solid component is introduced, progressively admixing said components immediately prior to extruding said pellets for forming a mixture of pelletable consistency, and subjecting said mixture to compacting pressure after said admixing for forming said pellets.

15. In a method of forming self-sustaining pellets from substantially solid products of solid and liquid reactants, the steps comprising introducing said solid reactant to a pelleting die, separately introducing said liquid reactant to said die closely adjacent to the point of introduction of said solid reactant, progressively admixing said reactants immediately prior to forming said pellets for forming a pelletable reaction mixture, and subjecting said reacting mixture to compacting pressure substantially immediately after said admixing effecting reaction between said reactants and formation of said pellets in said pelleting die.

16. In a method of forming a plurality of self-sustaining pellets from a mass of pulverous material by extrusion thereof through a pelleting die, the steps comprising introducing said material to said pelleting die, separately introducing to said pelleting die a fluid pelleting medium for admixture with said pulverous material, progressively admixing said fluid medium with said pulverous material to form a pelletable mash on the surface of said pelleting die immediately prior to extrusion therethrough, and extruding said mash under pressure through said die to form said pellets.

References Cited in the file of this patent

UNITED STATES PATENTS

| | | |
|---|---|---|
| 348,617 | Colhapp | Sept. 7, 1887 |
| 2,168,532 | McMath et al. | Aug. 8, 1939 |
| 2,520,337 | Roberts | Aug. 29, 1950 |
| 2,531,739 | Orsini | Nov. 28, 1950 |
| 2,565,830 | Weston | Aug. 28, 1951 |
| 2,597,553 | Weber | May 20, 1952 |
| 2,623,243 | Jean et al. | Dec. 30, 1952 |
| 2,653,350 | Piperoux | Sept. 29, 1953 |
| 2,700,941 | Johnson | Feb. 1, 1955 |
| 2,755,509 | Smidth | July 24, 1956 |
| 2,764,951 | Fisher | Oct. 2, 1956 |

FOREIGN PATENTS

| | | |
|---|---|---|
| 431,352 | Great Britain | July 5, 1935 |
| 159,369 | Germany | Aug. 26, 1940 |